United States Patent
Jeannin

(10) Patent No.: US 10,220,875 B2
(45) Date of Patent: Mar. 5, 2019

(54) SYSTEM FOR REDUCING STEERING COLUMN JERKS DURING AUTOMATIC ENGINE START-UP

(71) Applicant: RENAULT s.a.s, Boulogne-Billancourt (FR)

(72) Inventor: Aurelie Jeannin, Igny (FR)

(73) Assignee: RENAULT s.a.s, Boulogne-Bilancourt (FR)

( * ) Notice: Subject to any disclaimer, the term of this patent is extended or adjusted under 35 U.S.C. 154(b) by 0 days.

(21) Appl. No.: 15/324,205

(22) PCT Filed: Jun. 11, 2015

(86) PCT No.: PCT/FR2015/051540
§ 371 (c)(1),
(2) Date: Feb. 2, 2017

(87) PCT Pub. No.: WO2016/005669
PCT Pub. Date: Jan. 14, 2016

(65) Prior Publication Data
US 2017/0203784 A1    Jul. 20, 2017

(30) Foreign Application Priority Data
Jul. 9, 2014    (FR) ...................................... 14 56605

(51) Int. Cl.
*B62D 5/04*    (2006.01)
*B62D 5/06*    (2006.01)

(52) U.S. Cl.
CPC ......... *B62D 5/0463* (2013.01); *B62D 5/0469* (2013.01); *B62D 5/0481* (2013.01);
(Continued)

(58) Field of Classification Search
CPC .............................. B62D 5/0463; F02D 29/02
See application file for complete search history.

(56) References Cited

U.S. PATENT DOCUMENTS

| | | | | |
|---|---|---|---|---|
| 5,912,539 A * | 6/1999 | Sugitani | ................. | B62D 5/049 |
| | | | | 180/443 |
| 6,467,360 B1 * | 10/2002 | Bogdanov | ................ | B62D 6/10 |
| | | | | 73/862.333 |

(Continued)

FOREIGN PATENT DOCUMENTS

| | | |
|---|---|---|
| DE | 100 50 377 A1 | 4/2001 |
| EP | 2 163 457 A1 | 3/2010 |

OTHER PUBLICATIONS

International Search Report dated Sep. 2, 2015 in PCT/FR15/051540 Filed Jun. 11, 2015.

(Continued)

*Primary Examiner* — Alex C Dunn
(74) *Attorney, Agent, or Firm* — Oblon, McClelland, Maier & Neustadt, L.L.P.

(57) ABSTRACT

A method controls a power-steering assistance of a motor vehicle internal combustion engine that includes an automatic engine stop/restart system and an electric or electro-hydraulic power-assisted steering system. The method includes providing, during an automatic engine-stopping phase of the automatic stop/restart system, a steering assistance torque less than an assistance saturation value which is less than a nominal steering assistance value, and maintaining the steering assistance torque during an automatic engine-restart phase.

8 Claims, 2 Drawing Sheets

(52) U.S. Cl.
CPC ...... *B62D 5/0496* (2013.01); *B60Y 2300/192* (2013.01); *B62D 5/06* (2013.01)

(56) References Cited

U.S. PATENT DOCUMENTS

| | | | | |
|---|---|---|---|---|
| 8,948,970 | B2* | 2/2015 | Okada | B62D 5/0481 |
| | | | | 180/443 |
| 9,043,119 | B2* | 5/2015 | Horii | F02D 29/02 |
| | | | | 701/102 |
| 9,776,635 | B2* | 10/2017 | Khafagy | B60W 30/18 |
| 2003/0002686 | A1* | 1/2003 | Millott | F16F 15/00 |
| | | | | 381/71.1 |
| 2009/0241883 | A1* | 10/2009 | Nagoshi | F02N 11/0825 |
| | | | | 123/179.4 |
| 2009/0292449 | A1* | 11/2009 | Yamazaki | B60K 6/445 |
| | | | | 701/103 |
| 2010/0100282 | A1 | 4/2010 | Chapeau et al. | |
| 2012/0191302 | A1* | 7/2012 | Sternecker | B62D 5/0463 |
| | | | | 701/41 |
| 2013/0297153 | A1* | 11/2013 | Chauvelier | B62D 5/065 |
| | | | | 701/42 |
| 2015/0197276 | A1* | 7/2015 | Hause | B62D 5/046 |
| | | | | 701/41 |

OTHER PUBLICATIONS

French Search Report dated Mar. 23, 2015 in French Application No. 1456605 Filed Jul. 9, 2014.

\* cited by examiner

SYSTEM FOR REDUCING STEERING COLUMN JERKS DURING AUTOMATIC ENGINE START-UP

TECHNICAL FIELD OF THE INVENTION

The present invention relates to a system for reducing jerk generated on the steering column upon the restarting of an internal combustion engine of a motor vehicle equipped with an electric or electrohydraulic steering and with an automatic engine stop/restart system.

The invention relates more particularly to a steering assistance strategy for the phases of automatically starting the internal combustion engine following an automatic stopping in an automatic engine stop/restart sequence.

The invention also relates to motor vehicles equipped with an internal combustion engine and with engine stop/restart systems.

PRIOR ART

With a view to reducing automobile pollution and the emissions of gases from internal combustion or heat engines of motor vehicles, consumption optimization systems are installed in said vehicles. One of the best known and most effective of these systems is a system for automatically stopping/restarting the engine when the vehicle is temporarily immobilized, for example at a red light. Thus, when a vehicle is near to a stopping phase and its speed drops and falls below a defined threshold, of the order of around 10 km/h, the automatic stop/restart, or "stop-and-start", system automatically stops the operation of the engine. Thereafter, upon an input from the driver such as pressure on an accelerator pedal or clutch pedal, the engine restarts automatically with no input from an ignition key or an ignition button. Said automatic restart of the internal combustion engine is performed using a starter which demands an inrush of current from a current source comprising a battery.

What is to be understood in the remainder of the text by "automatic stopping" or "automatic restarting" of the engine is an engine stop/restart sequence commanded by the automatic stop/restart or "stop-and-start" system.

Also, what is to be understood by "on-board network" is the power supply to the wired network of the motor vehicle.

During the automatic-stopping phase, certain comfort or safety functions of the vehicle are or can be maintained, such as the air-conditioning or the power-steering assistance.

However, said steering assistance is provided by an electric motor which shares the same current source as the starter. Operation of said electric motor and, therefore, steering assistance, may therefore be affected by operation of the starter during the automatic engine restart.

Specifically, when the starter demands an inrush of current, this results in a drop in voltage seen by the on-board network which therefore affects the electric power-steering motor, particularly at operating points where there is a high demand for assistance. According to FIG. 3, the steering assistance torque 40 needed varies as a function of steering wheel angle 41. The need for steering assistance is greater for steering wheel positions close to the end stops B−, B+.

This phenomenon whereby there is a lack of/reduction in steering assistance associated with the starting of the engine occurs also upon initial engine start-up. However, in an initial start, when the driver turns the ignition key or presses on the start button, since no steering assistance had been provided beforehand while the engine was stopped, the driver does not then feel any sequence of firming-up of said steering column. Specifically, the effort required to turn the steering wheel is initially high without any power-steering assistance, then decreases when the engine is started as the steering assistance becomes available.

The case with automatic restarts following automatic stoppings of the engine is different: if the steering assistance is maintained during the automatic engine-stopping phase, the driver is likely to experience two different types of negative sensation:
 a firming-up of the steering column during the automatic restart phase,
 a jerk of the steering wheel during the automatic restart. This is because when the engine is started, the steering system is designed to straighten the wheels, which means to say to align them with the body of the vehicle. If said wheels were turned when the engine was stopped, this phase of realigning said wheels may lead to a fairly violent jerk.

One solution for minimizing the sensation of the firming-up of the steering column is to reduce the assistance during the automatic engine-stopping phase.

Publication JP-A1 2010173417 thus discloses a reduction in the steering assistance during the automatic-stopping phases by applying a gain coefficient to the steering assistance.

One disadvantage is that the gain is constant and is applied whatever the conditions of turning of the steering wheel at the time of stopping and whatever the environment of the vehicle.

The sensation of steering wheel jerk during heat engine restart is admittedly weaker, but the reduction in the sensation is not optimal. Specifically, there are several parameters that need to be taken into consideration when reducing the steering assistance during automatic engine-stopping, these notably including the steering angle of the wheels, which is a key parameter in defining the optimal level of assistance. Other parameters relating to the vehicle environment also need to be given consideration.

BRIEF SUMMARY OF THE INVENTION

It is an object of the invention to alleviate these disadvantages and the subject of the invention is a strategy for reducing the steering assistance during an automatic engine-stopping phase in an automatic engine stop/restart sequence.

The subject matter of the invention is more particularly characterized by a method of controlling the power-steering assistance of a motor vehicle internal combustion engine, comprising:
 an automatic engine stop/restart system,
 an electric or electrohydraulic power-assisted steering system comprising a control unit,
 characterized in that the method allows, during an automatic engine-stopping phase of an automatic stop/restart system, a level of steering assistance less than an saturation value which is less than a nominal steering assistance value, said level being designed to be maintained during the automatic engine-restart phase.

What is meant by nominal steering assistance value is the amount of assistance that the power steering needs to provide according to the speed of the vehicle with, for example, a largely sufficient electrical power.

Advantageously, the steering assistance is reduced during the engine-stopping phase preceding an automatic engine restart.

On the one hand, the steering assistance is maintained so that the driver is not troubled during said automatic-stopping phase.

On the other hand, the level of assistance during said automatic engine-stopping phase, less than a saturation value which is itself less than a nominal value, allows the less frequent occurrence of a drop in voltage of the network to have during the automatic restart.

Maintaining a level of steering assistance during the engine-stopping phase thus makes it possible to reduce the jerks upon the automatic restarting of the engine, notably when the steering wheel angle is other than 0 and the saturation level makes it possible to ensure the continuity of the level of assistance during the starting phase despite the drop in voltage of the on-board network.

According to other features of the invention:
the saturation value is determined iteratively during the automatic engine-stopping phase preceding an automatic restart.

Advantageously, the saturation value is determined iteratively throughout the automatic engine-stopping phase, so as to take account of the variations in the parameters that influence the level of steering assistance, so as to obtain an optimal steering-assistance value during the automatic restarting of the engine.

A calculation model for determining the saturation value of the steering assistance torque is devised as a function of the model of vehicle and technical characteristics thereof and of its accessories including the battery. Said calculation model is validated during a prior validation and measurement campaign. The calculation model is then recorded in a memory of a calculation unit of said vehicle.

the method allows the steering assistance torque less than the assistance saturation value below a vehicle speed threshold.

Advantageously, the steering assistance level is kept below the saturation value when the vehicle speed is below a speed threshold. The steering assistance level remains below a determined saturation value during the automatic engine-stopping phase until the vehicle reaches a speed threshold so as not to trouble the driver. Specifically, even when the engine is stopped, the vehicle may move and acquire a certain speed, particularly when it is on a downhill slope. Beyond said speed threshold, the steering assistance level then follows the recommended values for steering assistance as a function of various parameters including the vehicle speed.

the steering assistance saturation value is determined as a function of steering wheel angle.

Advantageously, the saturation value is determined as a function of steering wheel angle. Specifically, the level of steering assistance required is very high when the steering wheel is turned toward its end stops and the realignment of the wheels following the automatic restart may be accompanied by violent jerks.

the saturation value decreases when the steering wheel is turned toward the end stops.

the saturation value decreases when the steering wheel is turned towards the end stops beyond a steering wheel angle threshold.

Advantageously, the saturation value decreases as the steering wheel is turned toward the end stops, beyond a certain steering wheel angle threshold, and the level of steering assistance less than said saturation value decreases correspondingly so the driver feels heaviness in the steering from said steering wheel angle threshold onwards and will therefore be less inclined to turn the steering wheel toward the end stops during the phase in which the engine is stopped. Thus, the steering assistance required at the automatic restart will be less and will be affected little if at all by the drop in the voltage of the network. The driver will not feel any inconvenience or jerk during the automatic-stopping and restarting phases of the automatic stop/restart system.

the saturation value is determined as a function of vehicle temperature.

Advantageously, the steering assistance saturation value is determined as a function of vehicle temperature, said temperature is an important factor in the voltage available from the power supply system comprising a battery. The voltage available directly affects the steering assistance saturation value.

the saturation value is determined as a function of various parameters comprised in a list including the size of the battery and the load on the front axle assembly.

Advantageously, the saturation value is determined precisely, by considering various parameters in a list including the size of the battery and the mass on the front axle assembly of the vehicle. Certain parameters are derived from measurements and incorporated into the memory of the control unit.

The saturation value is calculated as a function of the vehicle parameters including the battery power and the load on the front axle assembly, so as to minimize what the driver feels during the automatic engine restart. Thus, the higher the battery power, the closer the saturation value is to a nominal steering assistance value, or is even higher than said nominal value. It is also important to provide greater steering assistance if the load on the front axle assembly is to be high.

The method comprises the following steps:
consideration of the values of the operating parameters which values are derived from the measurements.
determination of the steering assistance saturation value as a function of the values of the measured parameters comprising the vehicle temperature and of the values of parameters written to the memory.
determination of the nominal steering assistance.
comparison between the saturation value and the nominal value of the steering assistance and consideration of the smaller of the two values as being the saturation value.
determination of the steering assistance value.
maintenance of a steering assistance less than the saturation value during the automatic-stopping phase up to the automatic restart and until the vehicle running speed threshold is reached.

DETAILED DESCRIPTION OF THE FIGURES

The descriptions which follow refer to the longitudinal axis X.

To facilitate understanding on the part of the reader, the same objects or objects that have the same functions and which are referenced in the various figures retain the same references.

Figure 1:
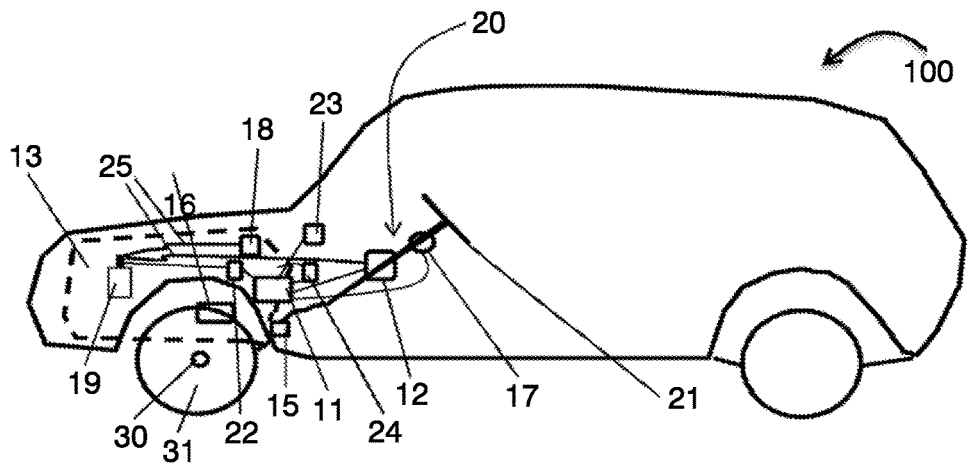
FIG. 1 is a schematic view in longitudinal section of a motor vehicle comprising an automatic stop/restart system and a power-steering assistance system.

As depicted in FIG. 1, a motor vehicle 100 comprises a steering column 20 controlled at a top end by a steering wheel 21 held by a driver (not depicted). Said steering column is connected to a power-steering assistance comprising an electric or electrohydraulic power steering motor 12 controlled by a control unit 11. Said power steering motor may be arranged either on the column 20 or on a rack 15 of the steering column, or sited remotely in the case of an electric pump unit.

The motor vehicle 100 comprises an internal combustion or heat engine 13 and an automatic stopping and restarting or "stop-and-start" system intended to reduce the emissions of pollutant gases and the fuel consumption. Thus, for example, when the vehicle is temporarily stopped or as said vehicle slows down to stop and is below a speed threshold, the automatic stop and restart system may allow the heat engine to be stopped automatically as a function of specific automatic-stopping conditions. It may then allow an automatic restarting of the engine, following said stoppage, as a result, for example, of an input on the part of the driver of the vehicle, said input being comprised within a list of actions including pressure on the accelerator pedal or clutch pedal in the case of vehicles with a manual transmission.

The control unit 11 is connected to measurement means comprising means for sensing the charge 22 of a battery 19, means for sensing the temperature 23 of the engine 13 of the vehicle and of the control unit 11 itself, means of sensing 24 the operation of said engine, means of measuring the speed 16 of said vehicle and also means of sensing 17 the steering wheel angle. Using the various measurements, said control unit 11 is able to deliver commands to the power steering motor 12 in order to modify the steering assistance.

In order not to trouble the driver during the automatic stopping of the engine, the steering assistance is maintained throughout the phase of the automatic stopping of the heat engine 13 up to the automatic restart. Specifically, the absence of steering assistance combined with the cutting-off of the heat engine may cause the driver to fail to understand how the vehicle is behaving.

However, at the automatic restart, a drop in voltage is perceived in the vehicle on-board network, as a result of the demand by the starter 18 for an inrush of current. The power steering motor 12, no longer having sufficient energy available, may fail to be capable of supplying nominal assistance to avoid the firming-up of the steering column 20 or the possible jerks of the wheels being returned to a neutral or straight aligned position. The driver may then feel an unpleasant sensation.

In order to alleviate the firming-up of the steering column as a result of the drop in voltage seen by the power steering motor 12, solutions may be to overspecify the battery or to incorporate specific power supply components; said solutions are therefore expensive for the comfort they afford.

The need for power-steering assistance is all the greater when the steering wheel 21 is turned toward the end stops. Specifically, FIG. 3 indicates on the ordinate axis the steering assistance torque 40 required as a function of steering wheel angle 41 on the abscissa axis; said assistance torque increases rapidly and substantially parabolically from a neutral position corresponding to a steering wheel angle of 0° toward the steering angle end stops B−, B+. Said steering assistance torque is connected with a wheel return force for returning said wheels from a turned position toward the neutral position. Said force is essentially dependent on the architecture of the front axle assembly of the vehicle, on the mass on said front axle assembly 30 and on the steering angle of the front wheels 31.

Violent jerks in the steering column at the time of the automatic restart are therefore liable to be felt by the driver notably if the wheels are turned to a large extent during said automatic engine-stopping phase. Specifically, on the restart, the wheels are naturally returned from the turned position to the neutral position, causing the steering wheel to return in the same direction. The further the wheels are turned toward the end stops B− or B+, the more violent this movement of the wheels is. The effort needed to return the wheels to the neutral position manifests itself in a jerk at the steering wheel 21, which is felt by the driver.

In order to alleviate said steering wheel return jerk, one solution is to lock the steering column. However, this solution may lead to potential steering lockup if not all of the conditions are met, and this is incompatible with the requirements of functional safety of the steering column.

The object of the invention is therefore to reduce the level of steering assistance to an optimal level during an automatic engine-stopping phase, notably at the extreme steering lock points. The steering assistance remains available throughout the automatic engine-stopping phase but remains below a saturation value. Said saturation value is defined so that the drop in voltage at the automatic restart has little or no effect on the level of steering assistance afforded during the automatic-stopping phase, so as to alleviate a potential firming-up of the steering or a steering jerk liable to be felt by the driver.

In order to maintain maximum driver comfort, said saturation value is different at different operating points. Said saturation value is thus reduced at the points that require a high assistance torque, which is the case when the wheels are highly turned, notably toward the end stops.

Said saturation value is less than the nominal steering assistance value and the driver is therefore liable to feel a progressive firming-up as he turns the steering wheel toward the end stops when the engine is stopped. Said driver is therefore incited not to turn the wheels excessively when the engine is automatically stopped. The power-steering assistance current consumption needed to counter the jerk when the engine is automatically restarted will therefore be reduced. The drop in voltage of the on-board network is therefore not likely to cause the driver any unpleasant sensation.

Figure 3:
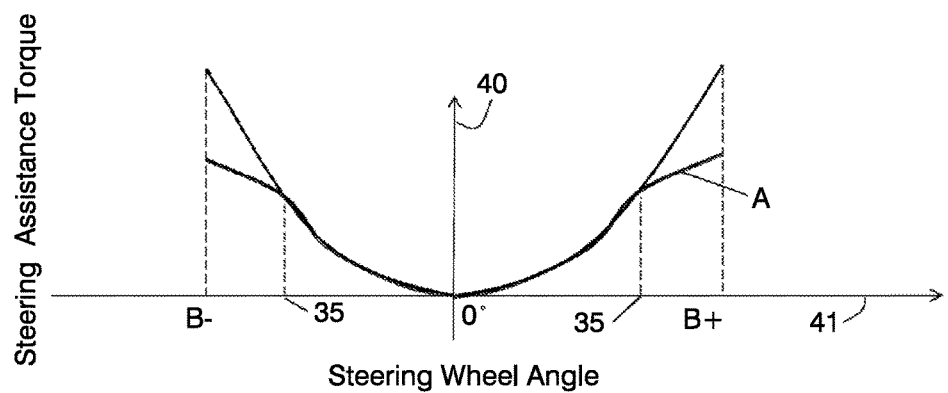
FIG. 3 is a curve indicating the steering assistance required as a function of steering wheel angle.

As indicated in FIG. 3, the steering assistance 40 may be reduced from a steering wheel angle threshold 35 to reach, for example, 60% of the steering assistance needed when the steering wheel is turned to reach said end stops B−, B+. The steering assistance may also be reduced according to other embodiments, uniformly from a point close to the steering wheel angle 0° point as far as said end stops or may be constant and equal to a maximum assistance value from said steering wheel angle threshold onwards.

When the engine is restarted automatically, with the wheels not turned to full lock, the steering wheel jerk caused by the realignment of the front wheels 31 is less significant and keeping the steering assistance at a saturation level therefore makes it possible to reduce the level of the said steering wheel jerk still further.

Said steering assistance saturation value is modified by considering vehicle parameters and values derived from instantaneous measurements.

A calculation model for determining the saturation value is devised as a function of the type of vehicle, considering technical characteristics of said vehicle and of the accessories thereof, including the battery 19 and the electric wiring 25, and of operating parameters of said vehicle. The optimal assistance level is evaluated with consideration:

of parameters specific to the vehicle, from a list including at least the mass on the front axle assembly 30 of the vehicle, the characteristics of the starter 18 and the load on the front axle assembly 30 as a function of the angle of the steering wheel 21, of the internal function of the elements of the chassis which comprise the axle assembly, the steering column 20 and the steering rack 15, of parameters derived from instantaneous measurements relating to the vehicle from a list including parameters relating to the vehicle, including the vehicle temperature, and of parameters associated with the operation of the vehicle, from a list including the vehicle speed, the steering angle of the front axle assembly and parameters directly influencing the operation of the steering assistance such as the charge of the battery 19, the ageing of the wiring 25 particularly between the battery and the power steering motor 12. The battery charge and the age of said battery 19 and of the electric wiring 25 may have a direct influence on the operation of the power steering motor and therefore on the level at which steering assistance is maintained. Because some of the available electrical power is assigned to this maintaining, the more aged the battery or the wiring, the lower will be the level of assistance maintained, so as to preserve minimal accessible-power values for the starter.

Figure 2:
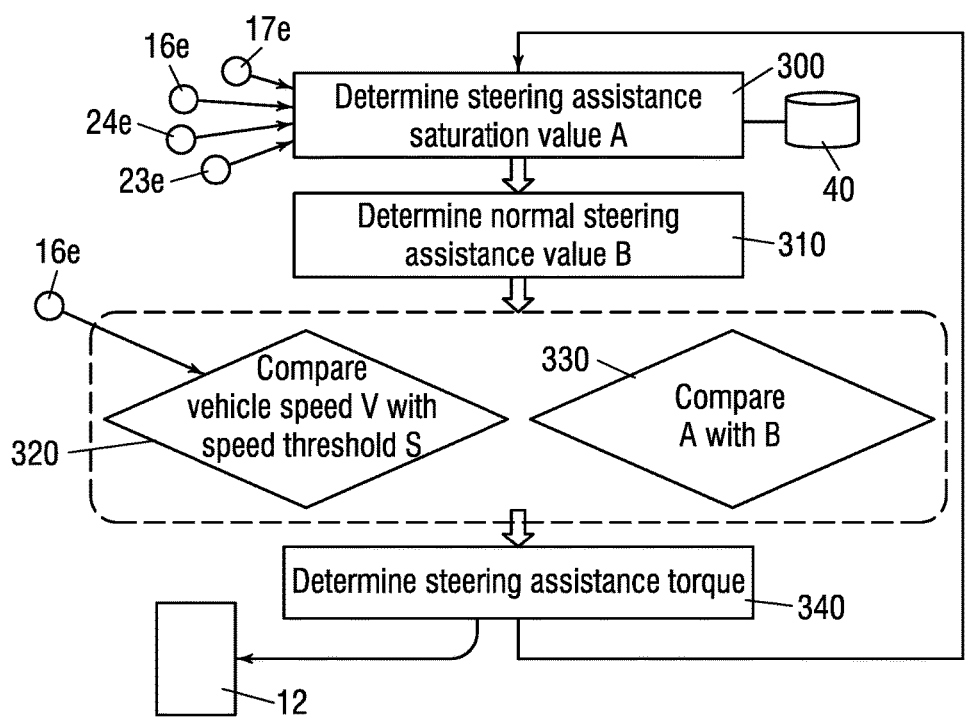
FIG. 2 is a flow diagram indicating the various steps of the method according to the invention.

According to FIG. 2, a calculation according to said calculation model is performed during an automatic engine-stopping phase in order to determine the steering assistance saturation value and therefore the steering assistance available for the automatic restarting of the engine. This calculation is repeated iteratively throughout the automatic engine-stopping phase with new measurements of said parameters.

The system for controlling the steering assistance therefore comprises:

means of sensing 17 the steering wheel angle,

For preference, as indicated in FIG. 3, the steering assistance requirement varies as a function of steering wheel angle substantially parabolically. The further the steering wheel is turned toward the end stops B− and B+, the higher the steering assistance needs to be. According to the invention, said steering assistance remains less than the saturation value and said saturation value decreases with the increase in steering wheel angle. Said saturation value may decrease uniformly from the steering wheel angle 0 point or from a steering wheel angle threshold onwards. The reduction in assistance may for example reach 40% of the need for steering assistance on reaching the end stops.

means of measuring vehicle speed 16, means of sensing 22 the charge of the battery 19, means of sensing 23 and of determining the vehicle temperature, and means of sensing 24 the operation of the engine.

The values derived from the measurements are sent to the calculation unit 11 in order to determine a steering assistance saturation value.

The vehicle temperature is derived from an estimate that considers temperature measurements from the engine 13 and the control unit 11. To do that, the sensing means 23 preferably comprise temperature sensors arranged at the engine 13 and in the control unit 11 and an engine operation sensor 24 is also needed. The temperature values measured are then sent to the control unit 11 to be incorporated into a model for determining the temperature, the result of which is the vehicle temperature value, said value is taken into consideration by all vehicle systems that need the temperature value.

A validation campaign is carried out beforehand in order to correlate the results derived from the calculation model according to a list of operating parameters and to determine:

points beyond which a steering wheel jerk upon automatic engine restart is deemed unacceptable. According to a given steering wheel angle, the restarting of the engine causes the wheels 31 to be realigned and the level of said realignment force can therefore be measured at the steering wheel. In the same way as is used to characterize the power steering control laws, the load for returning the front wheels to the neutral or straight aligned position is measured as a function of various steering angles. The measured values make it possible to determine a minimal level of steering assistance that prevents jerk that is acceptable to the driver during the automatic restarting of the engine according to different steering wheel angles. The parameters considered comprise the steering wheel angle, the steering wheel torque, the vehicle temperature, and the mass of the vehicle on the front axle assembly.

values of minimum voltage available for a model of battery 19. Said minimal available voltage value determines a minimal level of assistance torque as a function of the mass of the front axle assembly of the vehicle, of the internal friction of the elements of the chassis such as the steering column and the steering rack, the vehicle temperature, the steering wheel angle and the driver torque.

The list parameters considered during validation includes the mass on the front axle assembly, the vehicle temperature, the steering wheel angle and the battery voltage value.

Thus, for example, in order to evaluate the influence of the parameter of the mass of the front axle assembly 30 of the model of vehicle, a vehicle of the same model with the minimal load on the front axle assembly will be considered. The mass on the front axle assembly is then increased by adding additional load in steps of 50 kg until, for example, it reaches the mass of the front axle assembly of the heaviest powertrain used in that type of model of vehicle so that the calculation model can be validated for the entire range of that model of vehicle.

In order to correlate the results of the calculation model as a function of the temperature parameters, the validation campaign is generally carried out at three temperature points:

a minimal temperature of −40° C. with the vehicle installed in a cold room.

a nominal temperature of 23° C. externally.

a maximal temperature of +40° C. with the vehicle installed in a hot wind tunnel.

The temperature estimated internally to the control unit 11 is preferably read by a computerized tool that has access to the internal variables of the computer.

The vehicle temperature is an important parameter in the operation of the power steering system. For example, according to FIG. 4 which indicates the current voltage 43 available at the terminals of the battery 19 as a function of vehicle temperature 42, said voltage increases linearly from a minimal value at a negative temperature of the order of −40° C. up to the maximum value of Vmax for the voltage at a positive temperature of the order of 40° C. and remains constant and equal to said maximum value. Said minimum available voltage value is a factor in determining the minimum steering assistance torque available. The power steering motor 12 is therefore able to provide a steering assistance torque that varies in the same proportions as a function of temperature.

The calculation model takes into consideration the variations in steering assistance requirements as a function of steering wheel angle and of mass on the front axle assembly. The validation step includes testing comprising lock-to-lock maneuvers so as to consider the entire range of steering wheel angles between the end stops, the vehicle being placed on surfaces of known or maximum grip, such as on dry ground or ground with silex-filled hard tar. The driver torque is measured by a torque sensor incorporated into the power steering.

The saturation value A is determined by the calculation model. The steering assistance torque value is determined according to the method indicated in FIG. 2; said method comprises the following steps:

consideration of the values of the operating parameters which values are derived from the measurements (17e, 16e, 24e, 23e) by the measurement means in the vehicle which comprise:
- means of sensing steering wheel load (these are not depicted),
- means of measuring 16 the vehicle speed V,
- means of sensing the operation of the engine 24,
- means of sensing the temperature 23 surrounding the vehicle.

The measured values of steering wheel load, vehicle speed, engine operating status and external temperature are then sent to the control unit 11.

determination 300 of a steering assistance saturation value A as a function of the values of the measured parameters and of the values of parameters written to the memory 40 such as the mass of the front axle assembly of the vehicle.

determination 310 of a nominal steering assistance value B.

comparison 320 of the vehicle speed V with a speed threshold S.

comparison 330 between the saturation value A and the nominal value B of the steering assistance and consideration of the smaller of the two values as being the saturation value. Thus, if the calculated value of the saturation value A is below the nominal assistance value B, the steering assistance torque will not exceed the saturation value A. In the alternative, the steering assistance torque will not exceed the nominal steering assistance value B.

determination 340 of the value of the steering assistance torque during the automatic-stopping phase less than the saturation value below a vehicle running speed threshold S. Above the speed threshold S, the steering assistance torque can exceed the saturation value while remaining below the nominal steering assistance value.

Specifically, when the engine is stopped, the vehicle is, however, capable of running, notably when it is on a downhill slope, and of acquiring a certain speed V. Beyond said speed threshold S, the vehicle is considered to be in a running phase and the level of steering assistance returns to a nominal level of assistance torque calculated as a function of measurements of parameters including the vehicle speed and the steering column torque. The speeds at which the vehicle runs with the engine stopped are, however, relatively low and it is preferable to return the level of steering assistance to the nominal value for the sake of driver safety when the vehicle speed V exceeds the threshold S.

For vehicle speeds V below said threshold S, the level of steering assistance is kept below the saturation level, and the driver will be encouraged to turn the wheels less during this phase. The speed threshold is advantageously set relatively low, for example at 5 km/h. In this way, the driver is unlikely to experience any impediment in any potential low-speed vehicle maneuvers. The method becomes active only in an automatic stop. Beyond said speed threshold S, the level of assistance returns to the optimal level of assistance.

Validation of said speed threshold is performed for example with the vehicle on a downhill slope without starting the heat engine. Specifically, the vehicle is able to pick up speed and checks are made to ensure that the saturation value defined at 0 km/h remains valid at said speed threshold so as to perform the necessary maneuvers. The 5 km/h threshold is thus validated for applying the saturation value.

The objective of the invention is achieved: the steering assistance is maintained throughout the automatic engine-stopping phase and the method prevents any insufficiency of electrical power on the automatic restarting of the engine that could affect the steering assistance that could lead to steering wheel jerk.

The invention is not confined to the embodiments set out above and a person skilled in the art will therefore know how to make modifications necessary for use in conjunction with the invention.

Figure 4:
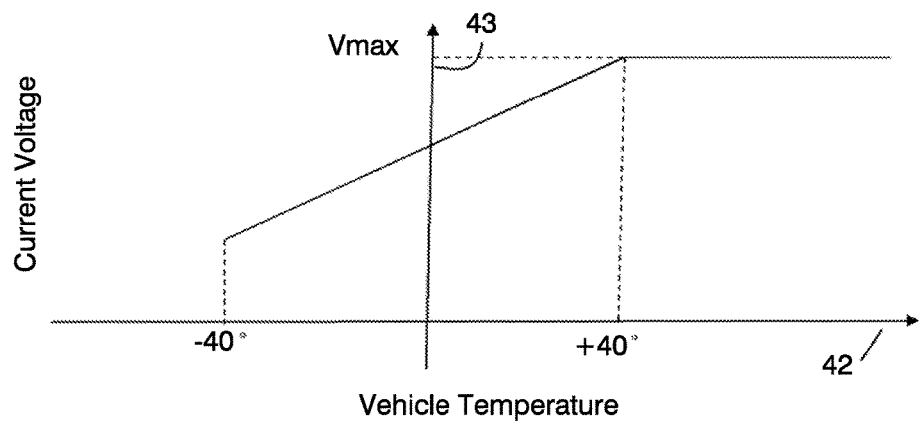
FIG. 4 is a curve indicating the current voltage available as a function of temperature.

For example, for certain types of motor vehicle, the steering assistance may be below a saturation value during an automatic engine-stopping phase, said saturation value decreasing according to a curve defined by means of validation testing and independent of at least one of the values from the list including the vehicle temperature by considering for example a minimum value of voltage available at the terminals of the power steering motor according to FIG. 4, the steering wheel angle and the mass on the front axle assembly. This solution then makes it possible to reduce the size of the calculation memories in the control unit and the calculation burden on said control unit.

The invention claimed is:

1. A method of controlling a power-steering assistance of a motor vehicle that includes an internal combustion engine, an automatic engine stop/restart system and an electric or electrohydraulic power-assisted steering system, the method comprising:
- determining a nominal steering assistance value, the nominal steering assistance value being a steering assistance torque to be applied via an electric power steering motor of the steering system with full power available;
- determining an assistance saturation value, the assistance saturation value being less than the nominal steering assistance value as a function of a steering wheel angle;
- applying a steering assistance torque, via the electric power steering motor, according to the nominal steering assistance value when a speed of the vehicle is above a speed threshold;
- lowering the steering assistance torque to the assistance saturation value when the speed of the vehicle falls below the speed threshold during an automatic engine-stopping phase of the automatic stop/restart system; and
- maintaining the steering assistance torque according to the assistance saturation value during the automatic engine-restart phase.

2. The method as claimed in claim 1, wherein the saturation value is determined iteratively during the automatic engine-stopping phase preceding an automatic restart.

3. The method as claimed in claim 1, wherein the saturation value decreases when a steering wheel is turned toward end stops.

4. The method as claimed in claim 1, wherein the saturation value decreases when a steering wheel is turned towards end stops beyond a steering wheel angle threshold.

5. The method as claimed in claim 1, wherein the saturation value is a function of vehicle temperature.

6. The method as claimed in claim 1, wherein the saturation value is determined as a function of various parameters comprised in a list including a size of a battery and a load on a front axle assembly.

7. The method as claimed in claim 1, further comprising:
considering values of operating parameters which values are derived from measurements;
determining the steering assistance saturation value as a function of the values of the measured parameters comprising vehicle temperature and of values of parameters written to a memory;
comparing between the saturation value and the nominal value of the steering assistance and considering a smaller of the saturation value and the nominal value as being the saturation value; and
maintaining the steering assistance torque according to the assistance saturation value during the automatic engine-stopping phase up to the automatic engine-restart and until the speed threshold is reached.

8. A system of controlling an electric steering assistance of an electric or electrohydraulic power-assisted steering system of a motor vehicle, the motor vehicle including an internal combustion engine and an automatic engine stop/restart system, comprising:
a control unit including circuitry that controls a power steering motor of the steering system to modify the electric steering assistance,
wherein the control unit is configured to:
determine a nominal steering assistance value, the nominal steering assistance value being a steering assistance torque to be applied via an electric power steering motor of the steering system with full power available;
determine an assistance saturation value, the assistance saturation value being less than the nominal steering assistance value as a function of a steering wheel angle;
apply a steering assistance torque, via the electric power steering motor, according to the nominal steering assistance value when a speed of the vehicle is above a speed threshold;
lower the steering assistance torque to the assistance saturation value when the speed of the vehicle falls below the speed threshold during an automatic engine-stopping phase of the automatic stop/restart system; and
maintain the steering assistance torque during the automatic engine-restart phase.

* * * * *

UNITED STATES PATENT AND TRADEMARK OFFICE
CERTIFICATE OF CORRECTION

| | | |
|---|---|---|
| PATENT NO. | : 10,220,875 B2 | Page 1 of 1 |
| APPLICATION NO. | : 15/324205 | |
| DATED | : March 5, 2019 | |
| INVENTOR(S) | : Aurelie Jeannin | |

It is certified that error appears in the above-identified patent and that said Letters Patent is hereby corrected as shown below:

On the Title Page

Item (73), the Assignee's information is incorrect. Item (73) should read:
-- (73) Assignee: RENAULT s.a.s, Boulogne-Billancourt (FR) --

<div style="text-align: right;">
Signed and Sealed this<br>
Twenty-eighth Day of April, 2020

Andrei Iancu<br>
*Director of the United States Patent and Trademark Office*
</div>